April 7, 1959  F. J. DIGNEY, JR., ET AL  2,881,391
VELOCITY INDICATOR FOR EXTRUSION PRESS
Filed March 18, 1954  2 Sheets-Sheet 1

INVENTORS
Frank J. Digney, Jr.
Frank Bevilacqua
BY:

ATTORNEY

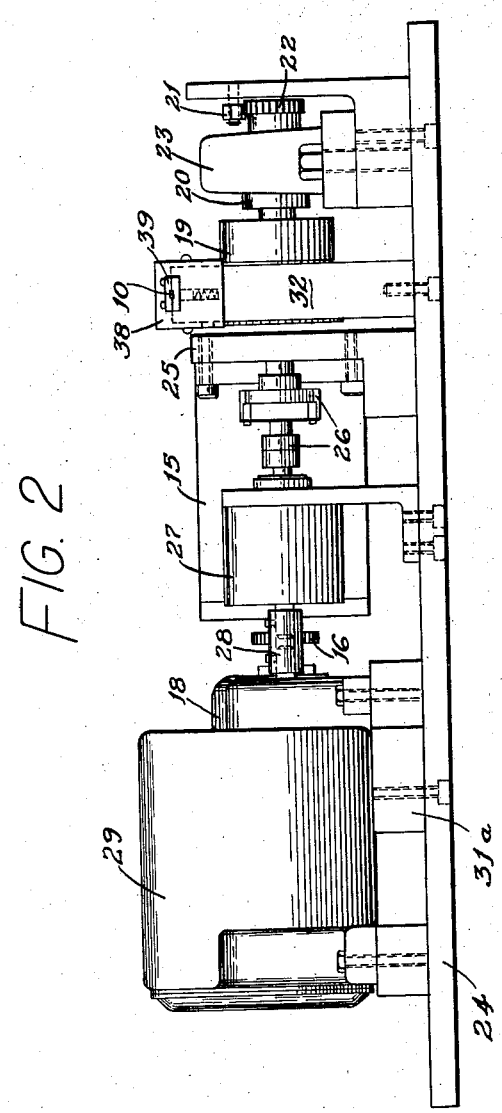
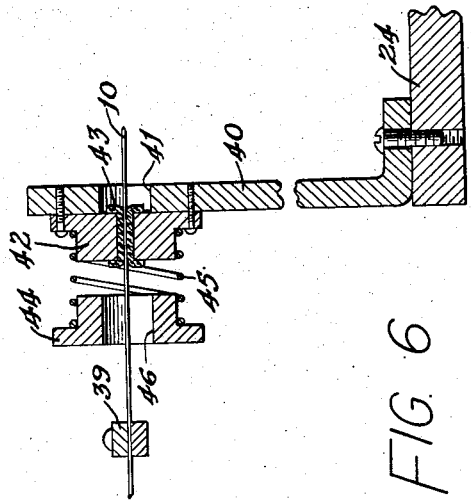
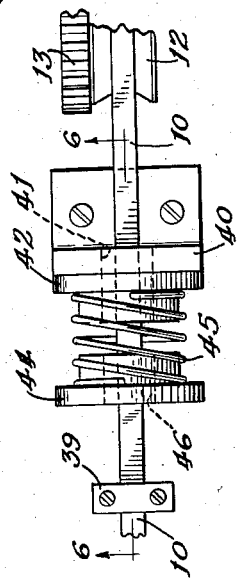

2,881,391
Patented Apr. 7, 1959

United States Patent Office

2,881,391
VELOCITY INDICATOR FOR EXTRUSION PRESS

Frank J. Digney, Jr., North Augusta, S.C., and Frank Bevilacqua, Fort Worth, Tex., assignors to the United States of America as represented by the United States Atomic Energy Commission Application March 18, 1954, Serial No. 417,242

4 Claims. (Cl. 324—70)

This invention relates to a velocity indicator and more particularly to an indicator for measuring linear velocity.

In certain types of machines, for example, an extrusion press, the working element has low speed on its working stroke and high speed on its return stroke. Even if it be assumed that only the speed of the working stroke is to be measured, there is still the problem of how to handle the speed indicator on the return stroke, for an indicator sensitive to the low speed of the working stroke may be unable to cope with the high speed on the return stroke.

An object of the present invention is to provide an apparatus for utilizing an indicator sensitive to low speeds, which apparatus will protect the indicator from any high speeds that may occur.

Other objects will become apparent from the disclosure that follows:

In the drawings:

Fig. 2 is an elevational view of the apparatus;

Fig. 5 is a fragmentary plan view showing a modified form of tape guide and a stop for limiting travel of the tape; and Fig. 6 is a vertical sectional view taken on the line 6—6 of Fig. 5.

Figure 4:
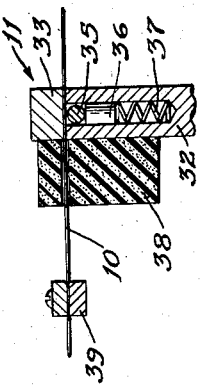
Fig. 4 is a vertical sectional view taken on the line 4—4 of Fig. 3, showing the tape guide and an elastic stop block for limiting the travel of the tape.

Reference character 10 designates a tape that may be of metal and that is connected with a movable part (not shown) of a machine such as an extrustion press the velocity of which part is to be measured. The tape passes through a guide 11 which will presently be described in detail and over a pulley 12 to which it is attached. A gear 13 is fixed to the pulley 12 and is in mesh with a pinion 14 driven by a control motor 15 having constant torque. The motor 15 also drives a gear 16 which is in mesh with a gear 17 which drives a generator 18.

Figure 1:
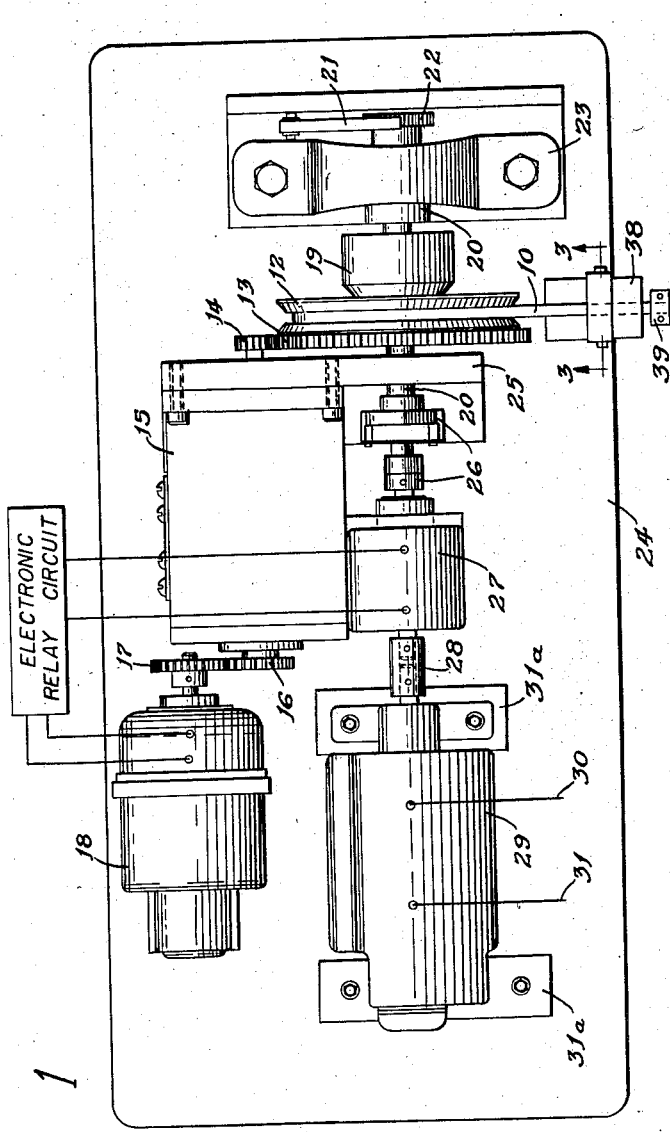
Fig. 1 is a plan view of the novel apparatus of the present invention.

The pulley 12 is connected to one side of an overrunning or one-way clutch 19, the other side of which is connected to a shaft 20. A pawl 21 and a ratchet gear 22 which the pawl engages and which is secured to the shaft 20 prevent the shaft from rotating in one direction. One end of the shaft 20 is journaled in a bracket 23 which is secured to a base plate 24. The other end of the shaft is journaled in a bracket 25 which is also secured to the base plate 24 and supports the control motor 15. A spring coupler 26 connects the shaft 20 with one side of a magnetic clutch 27, the other side of which is connected to a sleeve coupler 28. The sleeve coupler is also connected with a tachometer 29 which is adapted to produce voltage across lines 30 and 31 which is indicative of the speed of the shaft 20 and the tape 10. The tachometer is secured to shim blocks 31 which are secured to the base plate 24. The generator 18 and the magnetic clutch 27 are suitably connected as indicated in Fig. 1 so that when the generator produces a voltage above a given value the magnetic clutch is disconnected.

Figure 3:
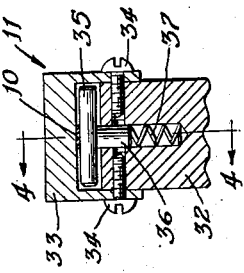
Fig. 3 is a vertical sectional view taken on the line 3—3 of Fig. 1, showing the details of a tape guide.

As shown in Figs. 3 and 4, the tape guide 11 comprises a bracket 32 secured to the base 24, a cap 33 secured to the upper end of the bracket 32 by screws 34, a roller 35, a plunger 36, and a spring 37. The plunger and spring are mounted in a recess in the bracket 32 and are urged upwardly against the roller 35 to cause it to press the tape against the underside of the cap 33. Thus the tape 10 is held or gripped by the tape guide 11, but may move lengthwise through the guide by virtue of the action of the roller 35. A resilient block 38 which may be formed of sponge rubber is affixed to the upper end of the bracket 32 so as to receive the tape 10 in a suitable slit formed in the block 38. A cross piece 39 is secured to the tape 10 and is longer than the slit in the block 38 so as to be prevented from passing therethrough. Thus, movement of the tape in one direction is limited, that is, movement to the right as viewed in Fig. 4, or wind-up movement on the pulley 12. The block 38 being of sponge rubber, will cushion the shock of engagement of the cross piece 39 therewith.

As has been previously stated, the tape 10 is to be connected to a suitable apparatus such as an extrusion press for measuring its velocity. It is contemplated that the extrusion press has a relatively low velocity on its working stroke which will involve movement of the tape 10 in a downward direction as viewed in Fig. 1 so as to unreel it from the pulley 12, and will have relatively high velocity on its return stroke which will involve upward movement of the tape 10 as viewed in Fig. 1 or winding up of the tape upon pulley 12. The one-way clutch 19 so connects the pulley 12 and the shaft 20 as to cause the pulley to rotate the shaft when the tape 10 moves downwardly as in Fig. 1 or unreels. When the pulley 12 rotates in the opposite direction, no drive to the shaft 20 is transmitted through the clutch 19, and the pawl 21 and ratchet gear 22 positively hold the shaft against rotation in this direction. Since the shaft 20 is connected with the pulley 12 so as to rotate therewith only when the tape 10 is being unreeled from the pulley 12 on the working stroke of the extrusion apparatus, the tachometer 29 rotates and indicates speed only when the extrusion press is on its working stroke. Thus, the tachometer, which is purposely constructed so as to be sensitive to the low speeds of the working stroke, is protected from damage due to the high speeds of the return stroke.

The control motor 15 provides the constant torque necessary to cause the tape 10 to be wound upon the pulley 12 by rotation of the pulley on the return stroke of the extrusion press. It is to be noted that the winding up of the tape 10 upon the pulley 12 is limited by engagement of the tape across piece 39 with the sponge-rubber block 38. Thus, this engagement occurs near the end of the return stroke of the extrusion press, with the result that when the working stroke starts there is a certain amount of movement of the extrusion press and the portion of the tape 10 outward of the cross piece 39 before the part of the tape 10 upon the pulley 12 begins to unreel. So there is a delay in the rotation of the tachometer 29. This arrangement protects the tachometer from excessive speeds that are found to occur at the start of the working stroke in certain extrusion presses.

If at any other time in the working stroke an excessive speed might occur which would be dangerous to the tachometer 29, such speed will cause the generator 18 to produce an excessive voltage that will make the magnetic clutch 27 disconnect the tachometer 29 from the shaft 20.

Figs. 5 and 6 illustrate the modified form of tape guide and device for limiting movement of the tape in one direction. A bracket 40 is secured to the base plate 24 and has near its upper end a large opening 41 through which the tape 10 freely passes. A rear shock plate 42 is secured to the upper end of the bracket 40 at the opening 41 and has an opening in which a felt member 43 is mounted which closely fits the tape 10. A forward shock plate 44 is mounted in spaced relation to the rear shock plate 42 by means of a coil spring 45 the ends of which embrace the shock plate. The forward shock plate has an opening 46 through which the tape 10 freely passes but which has a diameter smaller than the length of the cross piece 39 secured to the tape 10. Thus, when the tape is being wound up on the pulley 12 that is moving to the right as viewed in Figs. 5 and 6, such movement in this direction is limited by engagement of the cross piece 39 with the forward shock plate 44 and engagement of the forward shock plate with the rear shock plate 42. The cross piece first engages the forward shock plate which then moves against the spring 45 to engage the rear shock plate. Thus, a resilient stop to the movement of the tape 10 is provided.

The intention is to limit the invention only within the scope of the appended claims.

What is claimed is:

1. An indicator for measuring the linear velocity of an object, comprising a drum having its axis of rotation transverse to the linear movement of the object, a tape wound upon the drum and having its free end extending therefrom and adapted to be connected to said object, a shaft, torque means coupled to the drum to maintain a constant torque thereon in a direction to wind the tape on the drum, means coupling the shaft to the drum only when the drum rotates in a direction to unwind the tape, a sensitive tachometer coupled to the shaft, and stop means limiting the rotation of the drum in the direction to wind the tape upon the drum.

2. The indicator specified in claim 1, the stop means comprising a fixed shock plate receiving the tape in a closely fitting opening, a movable shock plate having an opening loosely receiving the tape, a coil spring having its ends in engagement with the shock plates so as to provide a resilient mounting of the movable shock plate on the fixed shock plate, and a cross piece secured to the tape and being longer than the diameter of the opening in the movable shock plate.

3. The indicator specified in claim 1, the stop means comprising a fixed bracket yieldingly gripping the tape, a sponge-rubber block fixed to the bracket and having a slit receiving the tape, and a cross piece fixed to the tape and being longer than the slit in the sponge-rubber block.

4. An indicator for measuring the linear velocity of an object, comprising a drum having its axis of rotation transverse to the linear movement of the object, a tape wound upon the drum and having its free end extending therefrom and adapted to be connected to said object, a shaft, torque means coupled to the drum to maintain a constant torque thereon in a direction to wind the tape on the drum, means coupling the shaft to the drum only when the drum rotates in a direction to unwind the tape, and a sensitive tachometer coupled to the shaft.

References Cited in the file of this patent

UNITED STATES PATENTS

| | | |
|---|---|---|
| 1,068,135 | Hutchison | July 22, 1913 |
| 1,111,345 | Wood | Sept. 22, 1914 |
| 1,323,240 | Bennett | Dec. 2, 1919 |